United States Patent [11] 3,604,964

| [72] | Inventors | Kenneth W. Conrad<br>Davenport;<br>Elmer M. Deters, Muscatine, both of, Iowa |
|---|---|---|
| [21] | Appl. No. | 38,976 |
| [22] | Filed | May 20, 1970 |
| [45] | Patented | Sept. 14, 1971 |
| [73] | Assignee | Red Jacket Manufacturing Company<br>Davenport, Iowa |

[54] SUBMERSIBLE MOTOR CONNECTOR ASSEMBLY
16 Claims, 5 Drawing Figs.
[52] U.S. Cl. .................................................. 310/71,
310/87, 310/68, 339/94
[51] Int. Cl. ................................................. H02k 5/22
[50] Field of Search ............................................ 310/87, 43,
71, 68, 68 D; 339/59, 60, 94, 47, 64, 89, 205, 177;
417/422, 410

[56] References Cited
UNITED STATES PATENTS

| 3,255,367 | 6/1966 | Schaefer.................... | 310/71 X |
| 2,935,720 | 5/1960 | Lorimer.................... | 339/205 X |
| 3,248,582 | 4/1966 | Brown....................... | 310/87 |
| 2,014,853 | 9/1935 | Ley et al..................... | 339/94 X |

Primary Examiner—D. F. Duggan
Assistant Examiner—B. A. Reynolds
Attorney—McCanna, Morsbach, Pillote & Muir ABSTRACT: A submersible motor connector assembly in which prong-type connectors are located in sockets on a submersible electric motor and on a detachable motor components housing, and a double-ended connector member is provided for electrically connecting the prongs on the motor and housing and for sealing the same from the surrounding medium.

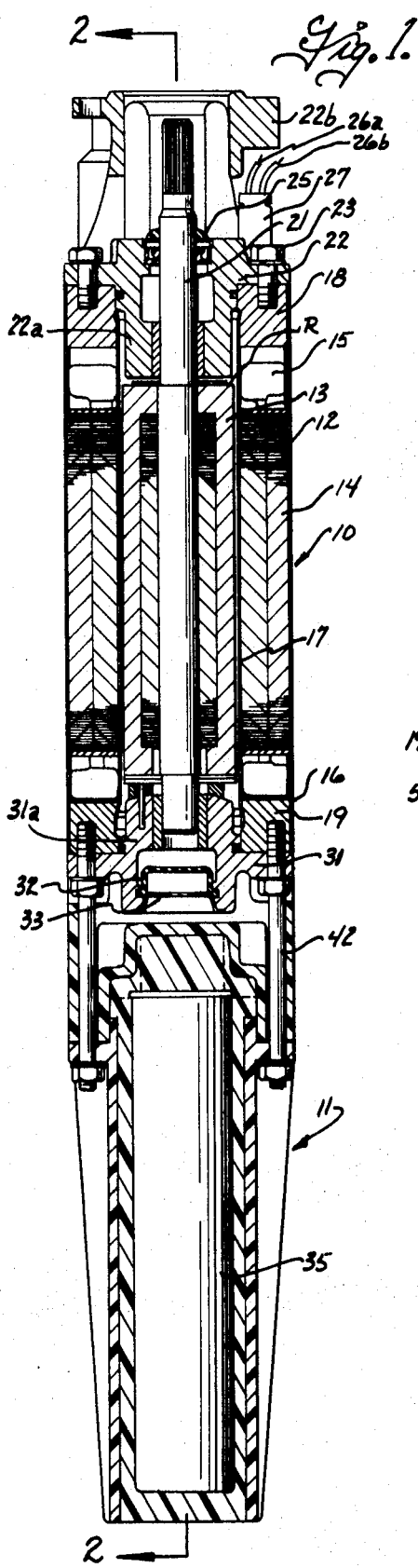

Inventors
Kenneth W. Conrad
Elmer M. Deters
By
McCanna, Morsbach, Pillote + Muir
Attorneys

SUBMERSIBLE MOTOR CONNECTOR ASSEMBLY

BACKGROUND OF THE INVENTION

It has heretofore been proposed as disclosed in U.S. Pat. No. 3,248,582 to provide a plug-type disconnect to electrically connect a submersible electric motor to a motor components housing. The connector disclosed in that patent embodied prong-type connector elements disposed in a socket in the end of the motor and a projecting plug on the components housing which was adapted to extend into the socket in the motor to electrically connect the motor components with the motor. The projecting plug portion on the housing however, was exposed whenever the housing was not mounted on the motor and was accordingly subject to damage due to engagement with an obstruction during storage, transportation or servicing of the motor components unit. Moreover, the resilient body of the plug-type connector tends to take a set after a substantial period of use and, if the components housing is removed from the motor for testing or servicing of the motor or components unit, the plug-type connector will not always reliably reseal when the components unit is reinstalled on the motor.

Accordingly, the present invention provides a submersible motor connector assembly in which prong-type connectors are protectively enclosed in sockets in the motor and in the detachable motor components housing, and a separate double-ended connector is provided to seal the interface between the motor and housing around the sockets therein and to electrically connect the connector prongs on the motor and housing.

An important object of this invention is to provide a connector assembly for a submersible motor and housing in which the connector elements are protectively enclosed in sockets in the motor and motor components housing so as to avoid damage to the connector elements when the motor components housing is disassembled from the motor.

Another object of this invention is to provide a connector assembly in which a separate double-ended connector member is utilized to interconnect the prong-type connector elements on the motor and motor components housing so that the connector member can be replaced, during testing and servicing of the motor or motor components unit, without necessitating breaking of the seals between the connector prongs on either the motor or the components housing.

Still another object of this invention is to provide a connector assembly of the type described for a submersible motor and motor components housing, which will reliably seal the electrical connector elements from the surrounding medium.

These, together with other objects and advantages of this invention will be better understood by reference to the following detailed description when taken in connection with the accompanying drawings wherein:

FIG. 1 is a longitudinal sectional view through a motor and motor components unit illustrating the same in assembled relation;

FIG. 2 is a fragmentary transverse sectional view taken on the plane 2—2 of FIG. 1 and illustrating portions of the motor and components unit on a larger scale than FIG. 1;

FIG. 3 is a diagrammatic view illustrating the electrical circuitry of the motor and motor components unit;

Figure 4:
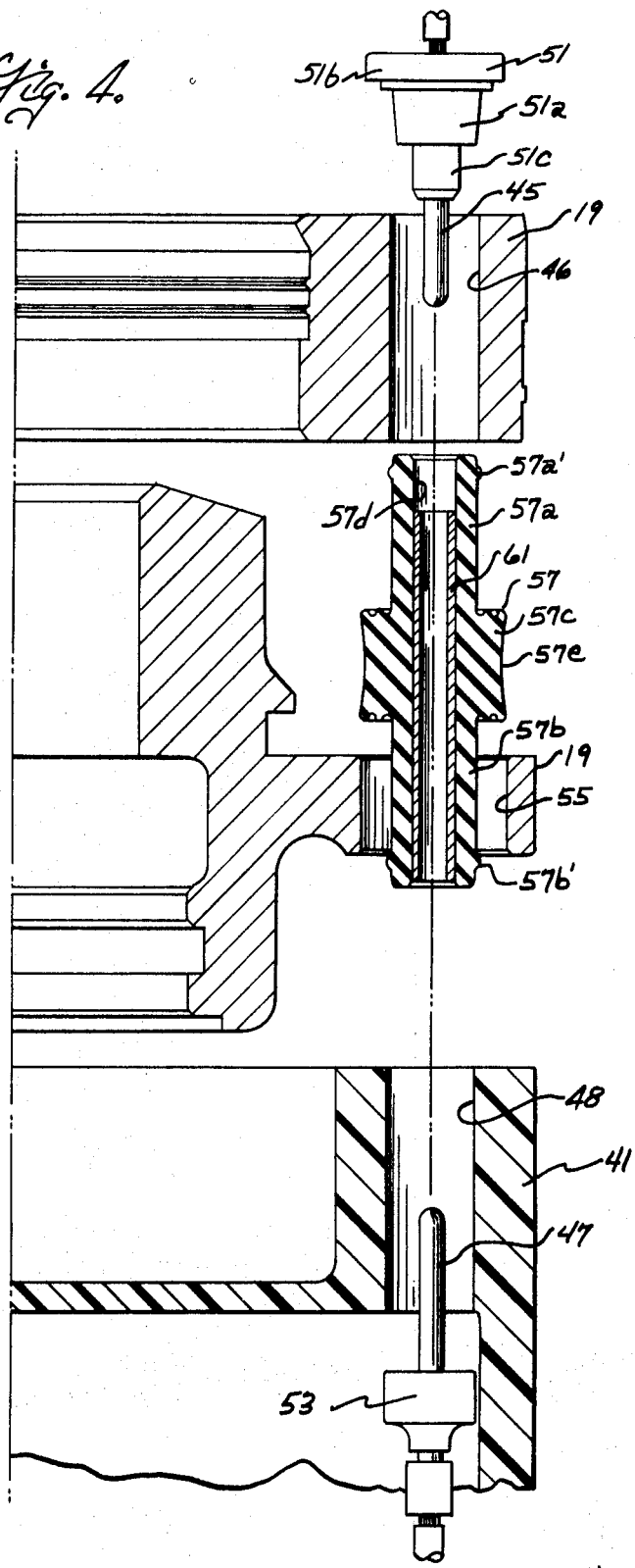
FIG. 4 is a fragmentary exploded sectional view illustrating portions of the motor, components housing and connector assembly on a larger scale than FIG. 2.

Referring now more specifically to FIGS. 1 and 2, there is illustrated a submersible electric motor 10 having a motor components unit 11 detachably mounted on the lower end thereof. The motor 10 includes a stator body 12 defining a rotor chamber P and a rotor 13 disposed in the stator body. The stator body comprises a laminated core structure 14 having motor windings 15, and which core and windings are disposed within an imperforate outer shell 16. The motor windings 15 are preferably sealed and for this purpose an inner tubular liner 17 is disposed within the core and end rings 18 and 19 are provided at opposite ends of the stator and sealed to the outer shell and to the liner to form a sealed-in closure for the stator windings. The rotor 13 is disposed in the stator and has a motor shaft 21 extending therefrom outwardly of the motor enclosure for connection to a pump (not shown). A motor end member 22 overlies the upper stator ring member 18 and is removably fastened thereto as by bolts 23. The motor end member 22 also includes a bearing hub 22a that rotatably supports one end of the motor shaft 21. A shaft seal 25 is provided on the end bell 22 to seal the interface with the shaft 21 and a fitting 22b is provided on the end member 22 and arranged for attachment to the pump unit (not shown) to mount the motor unit thereon. A plug type electrical disconnect 27 is provided on the upper end of the motor to enable disconnection of the power supply conductors 26a and 26b from the field windings in the motor. The plug-type disconnect can be of any suitable construction and may, for example, be of the type disclosed in the aforementioned U. S. Pat. No. 3,248,582.

The lower end of the stator body is closed by an end member 31, which end member has a bearing hub 31a that rotatably supports the lower end of the rotor shaft. The rotor chamber is commonly filled with a fluid (not shown) having suitable insulating and lubricating characteristics and, in order to accommodate thermal expansion and contraction of the fluid, a movable wall or expansion chamber 32 is provided in the end member 31. The expansion chamber has one side exposed to the fluid in the rotor chamber and the other side exposed to the surrounding medium and is retained in position as by a retainer 33. As diagrammatically shown in FIG. 3, the windings 15 of the motor includes a main winding 15a and an auxiliary winding 15b. The main winding 15a is connected to the prongs 27a and 27b of the plug-in disconnect 27 to power supply conductors 26a and 26b. As shown, the auxiliary winding 15b is connected to motor control components such as a capacitor 35 in the components unit 11. A plug-type disconnect assembly 36 is provided for electrically interconnecting the motor and motor components unit, when the unit 11 is attached to the motor.

The motor components unit 11 disclosed herein is of the type disclosed and claimed in the copending application of Kenneth W. Conrad, Ronald W. Albers and Elmer M. Deters entitled "Submersible Motor Components Unit for a Submersible Electric Motor," filed May 20, 1970, application Ser. No. 38,975. It is to be understood, however, that the components unit can be of different construction and may, for example, be of the type disclosed in the aforementioned U.S. Pat. No. 3,248,582. In general, the components unit 11 includes a housing 41 which is detachably mounted as by tie bolts 42 on the end of the motor 10. The housing defines an enclosure for the motor components 35 and the connector assembly 36 is provided at the adjacent ends of the motor and components unit. In the preferred embodiment illustrated, separate connector assemblies 36 are provided for each conductor leading from the motor to the motor components unit and, as shown, two separate connector assemblies are provided. It is to be understood, however, that the connector assemblies could be made of the multiple-terminal type, if desired.

Each connector assembly 36 includes a first prong means 45 disposed in a socket 46 in the motor; a second prong means 47 disposed in a socket 48 in the components housing, and a double-ended connector member 49 extending into the sockets and interconnecting the prong means 45 and 47. The sockets and prong means are so arranged that the prongs are disposed entirely within the sockets in the respective body so as to be protectively enclosed thereby when the motor and housing are disassembled, and the connector member 49 is separable from both the motor and housing so that it can be replaced without interrupting the sealed connections of the prong means 45, 47 with their respective motor and components housing.

More particularly, the socket 46 comprises a bore that extends through the end ring 19 and which is closed at its inner end by a resilient plug member 51 that seals the inner end of the socket and supports the prong means 45 while electrically insulating the same from the end ring. As best shown in FIG. 4, the plug 51 has a normally tapered wall portion 51a adapted to have a tight fit in the socket 46; a shoulder portion 51b that overlies the inner end of the end ring 19, and a reduced diameter portion 51c that extends inwardly of the socket around the prong means 45, for a purpose described hereinafter. The socket means 48 in the components housing 41 comprises a passage that extends through the end of the housing and which is closed and sealed at its inner end by a resilient plug 53 formed of an electrically insulating material such as rubber and which has a tight fit in the passage to seal the inner end of the socket 48 and support the prong 47. As will be seen from FIG. 2, the prongs 45 and 47 are disposed entirely within their respective sockets 46 and 48 so as to be protectively enclosed thereby, when the motor and housing are disassembled, to thereby minimize the possibility of bending or breaking of the prongs due to striking and obstruction during handling of the separated motor and housing units.

Figure 5:
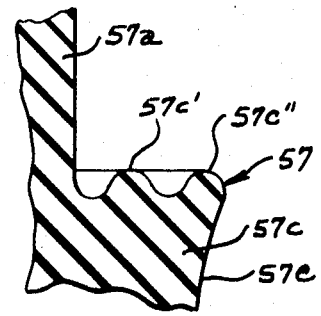
FIG. 5 is a fragmentary sectional view through the motor connector member illustrating the same on a larger scale than FIG. 4.

An enlarged connector chamber 55 is provided at the adjacent ends of the sockets 46 and 48. This enlarged connector chamber is conveniently formed by a bore or opening that extends through the flange of the end bell 31 and which has a cross section larger than the socket 46 so as to define a first axially facing shoulder 46a around the socket 46. The opening 55 in the end bell also has a cross section larger than the socket 48 and defines a second axially facing shoulder 48a around the socket 48 in the housing. A separate double-ended disconnect member 57 is provided for electrically connecting the prongs on the motor and housing and for sealing the same from the surrounding medium. This connector member, as best shown in FIGS. 4 and 5, includes a resilient body having first and second plug portions 57a and 57b, and an enlarged intermediate portion 57c. As will be seen from FIG. 4, the plug portions 57a and 57b have a diameter approximating the diameter of the sockets 46 and 48 respectively so as to be telescopically receivable thereinto and an integral peripheral bead 57a' and 57b' is preferably provided on each of the plug portions 57a and 57b to form a seal with the respective socket. The beads 57a' and 57b' have a normal outer diameter larger than the cross section of the respective socket so as to be radially deformed when the plug portions are pressed into the socket to seal the socket. The intermediate portion 57c has a normal axial thickness slightly greater than the spacing between the shoulders 46a and 48a so that the intermediate portion 57c is axially compressed to seal against the shoulders when the housing is mounted on the motor. As best shown in FIGS. 4 and 5, the end faces of the intermediate portion are preferably formed with concentric ridges 57c' and 57c'' which are adapted to be axially compressed, and the outer periphery of the intermediate portion is preferably formed with a longitudinally concave contour indicated at 57e to allow radial expansion of the intermediate portion when it is axially compressed. A double-ended female conductor member is provided for electrically interconnecting the prongs 45 and 47. This conductor member is conveniently in the form of a tube 61 of electrically conductive material that is preferably slidably disposed in a passage 57d in the body 57. As shown, the tube 61 is somewhat shorter than the overall length of the body 57 by an amount the length of the reduced diameter portion 51c on the plug 51 to accommodate the reduced portion 51c on the plug 51 when the connector member is positioned in the socket 46 as shown in FIG. 2. The bore or passage 57d in the member 57 is formed with a cross section to snugly fit over the projecting portion 51c on plug 51 to form an additional seal therebetween.

Since the motor end ring 19 has a limited radial thickness, it is preferable to utilize individual connector assemblies 36 for each conductor that extends between the motor and the components unit, so as to minimize the cross section of each of the connector assemblies. With this arrangement, the sockets 46 and 48 can be relatively small diameter bores in the end ring and housing respectively and the connector prongs 45, 47 can be disposed concentrically of the bores.

From the foregoing it is thought that the construction and operation of the submersible motor connector assembly be readily understood. The motor components unit 11 is detachably mounted on the end of the motor as by bolts 42 and, when assembled, the resilient body portions of the connector members 57 have the intermediate portion 57c thereof axially compressed between the shoulders 46a and 48a to seal the sockets from the surrounding medium. In addition, the bead portions 57a' and 57b' seal against the walls of the respective sockets 46 and 48 to provide a secondary seal against the entrance of the surrounding medium to the electrical connector prongs 46 and 47. Further, the plug portion 58a is arranged to seal against the projecting portion 51c on the plug 51. When the housing is disassembled from the motor, the connector member 36 can be removed without breaking the seals at the inner ends of the sockets 46 and 48 formed by the respective plugs 51 and 53. In addition, the connector member can be readily replaced to assure reliable sealing of the connector assembly, when the components unit is thereafter remounted on the motor. Further, the double-ended connector member accommodates a relatively wide tolerance variation in misalignment of the prongs 45, 47 and sockets 46, 48.

The embodiments of the invention in which an exclusive property or privilege is claimed are defined as follows:

1. In a submersible motor assembly including a motor having a rotor and a stator, a motor components housing having one end detachably mounted at one end of the motor, a first connector socket extending inwardly of said motor from said one end of the motor and having a closed inner end, a second socket extending inwardly of said housing from said one end of the housing and having a closed inner end, a first connector prong means extending lengthwise of said first socket from its closed inner end and disposed entirely within said first socket, a second connector prong means extending lengthwise of said second socket from its closed inner end and disposed entirely within said second socket, and a double-ended connector member of resilient dielectric material having first and second plug portions at opposite ends extending into said first and second sockets in sealed relation therewith, and a double-ended female conductor element in said connector member receiving said first and second prong means to electrically connect the same.

2. In a submersible motor assembly including a motor having a rotor and a stator, a housing having one end detachably mounted at one end of the motor, said motor and housing having a motor connector chamber formed in the adjacent ends thereof including an intermediate chamber portion at the interface between the motor and housing and first and second socket portions extending in opposite directions from said intermediate chamber portion, said socket portions each having a cross section smaller than said intermediate chamber potion and defining first and second shoulders respectively at the juncture of the first and second socket portions with the intermediate chamber portion, said first socket portion being formed in said motor and having first connector prong means extending from the inner end of the socket and terminating inwardly of said one end of the motor, said second socket portion being formed in said housing and having second connector prong means extending from the inner end of the second socket and terminating inwardly of said one end of the housing, a double-ended connector member including a resilient body having an enlarged intermediate body portion disposed in said intermediate chamber portion and first and second reduced plug portions extending into said first and second socket portions, said intermediate portion normally having an axial thickness slightly greater than the spacing between said first and second shoulders to be clamped therebetween, and a conductor element in said resilient body engaging said first and second prong means to electrically connect the same.

3. The combination of claim 2 wherein said first and second plug portions are dimensioned to sealingly engage the sidewalls of said first and second socket portions.

4. The combination of claim 2 wherein said first and second plug portions have at least one integral peripheral bead extending therearound at a location spaced from said intermediate portion and dimensioned to be radially compressed when the first and second plug portions are inserted into said first and second socket portions.

5. The combination of claim 2 wherein said intermediate body portion has integral annular ribs on the end faces thereof engageable with said first and second shoulders.

6. The combination of claim 5 wherein the peripheral wall of said intermediate body portion is normally longitudinally concave to allow radial expansion of the intermediate body portion when axially clamped between said first and second shoulders.

7. The combination of claim 2 wherein said resilient body has a passage extending therethrough and said conductor element comprises a tubular element slidably disposed in said passage.

8. In a submersible motor assembly including a rotor, a stator surrounding the rotor and having field windings therein and an end ring at one end of the stator, said end ring having a first socket opening at the outer end face thereof, an end bell overlying said outer face of said end ring, said end bell having an opening therethrough registering with said first socket and having a cross section larger than said first socket to define a first shoulder around the end of said first socket, a housing member detachably mounted on said end bell at the side opposite said end ring and having a second socket therein aligned with said first socket and having a cross section smaller than said opening in the end bell to define a second shoulder around said second socket, a first prong means on said motor extending into said first socket and a second prong means on said housing extending into said second socket, and a double-ended connector member including a resilient body having first and second plug portions extending into said first and second sockets and an enlarged intermediate portion disposed in said opening in said end bell and normally having an axial thickness slightly greater than the axial length of said opening in said end bell to be axially compressed between said first and second shoulders when said housing is attached to said end bell, said connector member including a conductor element in said resilient body and engaging said first and second prong means to electrically connect the same.

9. The combination of claim 8 wherein said first prong means terminate inwardly of the outer end of said first socket and said second prong means terminate inwardly of the outer end of said second socket.

10. The combination of claim 8 wherein said first and second plug portions are dimensioned to sealingly engage the sidewalls of said first and second sockets.

11. The combination of claim 8 wherein said first and second plug portions have at least one integral peripheral bead extending therearound at a location spaced from said intermediate portion and dimensioned to be radially compressed when the first and second plug portions are inserted into the first and second sockets.

12. The combination of claim 8 wherein said intermediate body portion has integral annular ribs on the end faces engageable with said first and second shoulders.

13. The combination of claim 12 wherein said intermediate body portion is normally longitudinally concave to allow radial expansion of the intermediate body portion when axially clamped between said first and second shoulders.

14. In a submersible motor assembly including a rotor, a stator surrounding the rotor and having field windings therein and an annular end ring at one end of the stator, said end ring having a first pair of sockets at spaced locations therearound and opening at the outer face of the end ring, an end bell overlying said outer face of the end ring and having a second pair of openings extending therethrough registering with sockets of said first pair, said openings in the end bell each having a cross section larger than the respective sockets of said first pair of sockets to define first shoulders around the end faces of the sockets of the first pair of sockets, a motor components housing detachably mounted on said end bell at the side opposite said end ring and having a second pair of sockets therein aligned with respective ones of said first pair of sockets, said sockets of said second pair having a cross section smaller than said openings in the end bell to define a second shoulder around each of said second sockets, a first prong means on said motor extending into each of said first sockets and a second prong means on said housing extending into each of said second sockets, and a pair of double-ended connector members each including a resilient body having first and second plug portions extending into respective ones of said first and second sockets and an enlarged intermediate portion disposed in respective ones of said openings in said end bell, said intermediate portions normally having an axial length greater than the axial length of said openings in the end bell to be axially compressed between respective ones of said first and second shoulders when the housing is attached to the end bell, said connector members each including a conductor element in said resilient body and engaging respective ones of said first and second prong means to electrically connect the same.

15. The combination of claim 14 wherein the first prong means terminate inwardly of the ends of the respective first sockets and the second prong means terminate inwardly of the ends of the respective second sockets.

16. The combination of claim 14 wherein said sockets, said openings and said resilient body have a circular cross section, said prong means comprising a single concentric prong in each socket.